Figure 1:
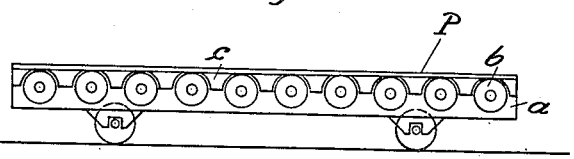

March 24, 1931. L. VON REIS 1,797,626
TRAVELING TRANSPORTING TABLE FOR GLASS PLATES Filed May 28, 1928

Inventor:
Lambert von Reis
per
Attorneys

Patented Mar. 24, 1931

1,797,626

UNITED STATES PATENT OFFICE

LAMBERT VON REIS, OF HERZOGENRATH, GERMANY, ASSIGNOR, BY MESNE ASSIGNMENTS, TO THE AMERICAN BICHEROUX COMPANY, A CORPORATION OF DELAWARE

TRAVELING TRANSPORTING TABLE FOR GLASS PLATES

Application filed May 28, 1928, Serial No. 281,289, and in Germany May 30, 1927.

The transporting of glass plates, for instance from the place of formation to and through the leer for annealing, is generally carried out by means of traveling transporting tables or stationary roller tracks. The traveling tables possess over roller tracks the advantage of allowing the leer to be erected at any desired point independent from the position of the plate forming machine, while with the use of a roller path the leer must be situated substantially in a straight line with the machine. Besides, by employing traveling transporting tables more than one leer may be arranged at various places for co-operation with one and the same machine, as the tables may easily be run to the entrance of one or another of a plurality of leers. By using traveling tables it is possible to push a table with a glass plate on it out of the way and allow the plate to remain on the table until it has solidified sufficiently to be pushed into a leer, while in the meantime another table may be run up to the forming machine for receiving a fresh plate. The traveling transporting tables heretofore known have had uninterrupted or smooth or rough receiving surfaces which surfaces offer to the glass plates when they pass on or off the tables more or less resistance which is detrimental to the plates.

Now the present invention has for its object to provide a traveling transporting table for glass plates the most essential feature of which is in that the receiving surface of the table is formed by a series of rotatable rollers. These rollers considerably facilitate the running of the glass plates onto and off the tables.

Another object of the invention is to arrange bridge members in the spaces between the rollers of the table to prevent the glass from sagging into these spaces.

The subject-matter of the invention is illustrated by way of example in the accompanying drawing, in which Figs. 1-4 are diagrammatic side elevations of glass plate transporting tables constructed in accordance with the invention.

The tables consist of a wheeled frame ($a$) in which a series of rollers ($b$) are mounted so as to form the table top. The rollers ($b$) may either be freely rotatable or positively driven at a variable speed by means of any suitable gearing. In the latter case, it is for instance preferable to drive the rollers ($b$) at the rolling speed of the glass rolling machine when a table is receiving a glass plate from such machine, and to drive the rollers at annealing speed when the plate has to be conveyed from the table into a leer.

Figure 2:
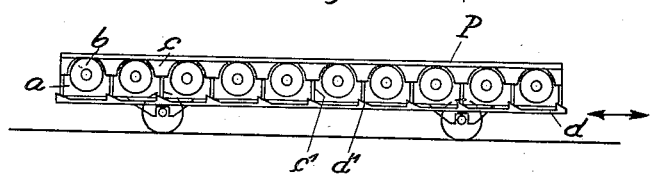
Figure 3:
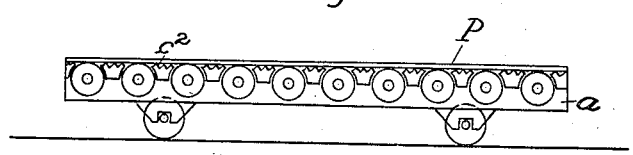

Arranged in the spaces between the rollers ($b$) are bridge members ($c$) which serve to prevent sagging of the glass between the rollers. The members ($c$) may either be fixed, as shown in Figs. 1 and 3, or vertically adjustable as shown in Fig. 2. Any proper means may be used for effecting the vertical adjustment of the members ($c$). According to Fig. 2, the adjusting means consist of one or more horizontal shiftable bars ($d$) which act through cams ($d^1$) on depending brackets ($c^1$) of the members ($c$). By the aid of the adjusting means, the members ($c$) may be raised with their upper surfaces into the plane of the upper edges of the rollers ($b$) so as to form an even surface with the same. When a glass plate carried by a table has set sufficiently for being introduced into the leer, the members ($c$) are lowered so as to disengage them from the glass plate and allow the plate to be readily run off the table by the rotation of the rollers.

The surfaces of the members ($c$) may either be smooth or they may be fluted as indicated at ($c^2$) in Fig. 3 for reducing the contact area between the members and the glass plates and preventing too rapid cooling of the glass.

Figure 4:
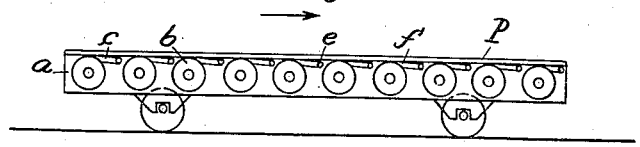

Fig. 4 shows a modified form of bridge members. The bridge members consist of plates ($c$) pivotally supported at one of their longitudinal edges by pins ($e$) and loosely resting by their other longitudinal edges ($f$) on the rollers ($b$). The last-said edges are tapered and shaped so as to fit tightly to the roller surface so that the head of the plate in its movement over the table will not be caught between the rollers and the bridge members. The bridge members are also slightly inclined in the direction of the movement of the glass—see the arrow in Fig. 4—for facilitating the gliding of the plate head from one roller to the other.

P indicates a glass plate carried by each of the tables illustrated.

In my divisional application filed June 8th, 1929, Ser. No. 369,415, I claim the construction shown in Figure 4 of this application.

Having thus described my invention, what I claim as new and desire to secure by Letters-Patent is:—

1. In a transporting device for hot glass plates comprising a series of spaced parallel rollers rotatably mounted in a frame, forming the transporting receiving surface for the conveyor, bridge members to bridge the spaces between said rollers with means for vertically simultaneously adjusting said bridge members.

2. A conveying device for hot glass plates comprising a frame, a series of spaced parallel rollers rotatably mounted in said frame forming the conveying surface for said conveyor, members to bridge the spaces between the several members with means for simultaneously adjusting said bridge members, said means comprising bars acting through cams on depending brackets of said bridge members.

3. The method of conveying hot glass plates which comprises feeding said plates on a conveyor composed of spaced parallel rollers rotatably mounted with adjustable bridge members filling the spaces between the several rollers, the tops of said bridge members and of said rolls being in the same plane and thereafter when the glass has solidified removing the support afforded by the bridge members and rotating the members to remove the somewhat hardened glass from the conveyor.

4. The method of conveying hot glass plates which comprises feeding said plates on a receiving surface of a conveyor to support the entire plate and after the glass has solidified removing the support afforded by part of the conveyor and revolving the remaining support of the receiving surface of said conveyor to convey the glass ahead.

5. The method of conveying hot glass plates which comprises supporting the entire plate on a conveyor and after the glass has solidified removing the support afforded by part of the conveyor and revolving the remaining support of the glass.

In testimony whereof I have signed my name to this specification.

LAMBERT von REIS.